United States Patent Office 3,396,393
Patented Aug. 6, 1968

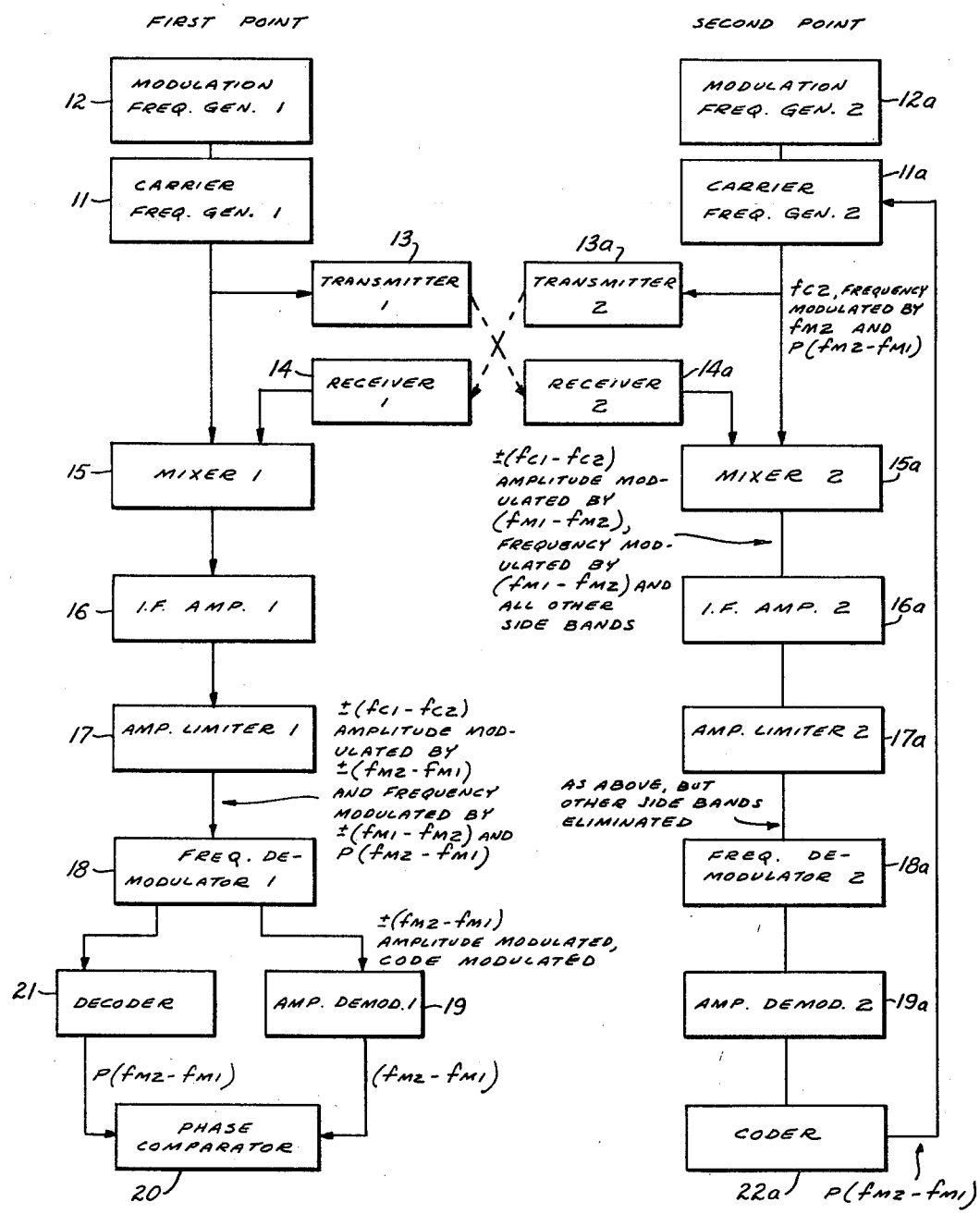

3,396,393
MEASUREMENT OF THE DISTANCE BETWEEN TWO POINTS BASED ON MEASURING THE TRAVELLING TIME OF ELECTROMAGNETIC WAVES
Richard Wagner, Nuremberg, Germany, assignor to Grundig E.M.V. Elektro-Mechanische Versuchsanstalt Inh. Max Grundig, Furth, Bavaria, Germany
Filed Jan. 11, 1967, Ser. No. 608,615
Claims priority, application Germany, Jan. 14, 1966, G 45,716
4 Claims. (Cl. 343—14)

ABSTRACT OF THE DISCLOSURE

Frequency modulated waves of slightly different carrier and modulation frequencies are generated at each point, transmitted from each point to the other, and heterodyned with the locally generated waves.

The resultant intermediate frequency waves are amplified over such a bandwidth as to include the first order sidebands of the modulation frequency. At each point, amplitude limiting, frequency demodulation and amplitude demodulation follow. At the second point the resultant wave is applied as a second modulation. At the first point, the phases of the amplitude demodulated and frequency demodulated waves are compared to yield a measure of the distance between the points.

Background of the invention

The conventional method of measuring the distance between two points by measuring the traveling time of the electromagnetic waves between these two points may be described as follows: In measuring the distance from a first point to a second point two sets of equipment, generally identical, are used, one at each point. A carrier frequency and a modulation frequency are generated at each point, the carrier frequency and the modulation frequency at point one differing slightly from the corresponding quantities at the second point. A modulated electromagnetic wave is generated at each point. Each of these modulated electromagnetic waves is transmitted from the one point to the other, received at the other point and there mixed with the locally generated modulated electromagnetic wave. The resultant modulated intermediate frequency wave is amplified by a very narrow band intermediate frequency amplifier, such that a signal results whose carrier frequency is equal to the difference between the two generated carrier frequencies and which is amplitude modulated by the difference between the two modulation frequencies. At the second point the resultant wave is put through an amplitude detector and a pulse former and the resultant pulse is introduced as an added modulation to the carrier frequency generator at the second point. At the first point the frequency modulated component of the intermediate frequency, which because of the narrow band of the intermediate frequency amplifier contains only this additional modulation, is demodulated in a frequency discriminator and the output of the frequency discriminator is fed to one input of a phase meter. The output of the intermediate frequency amplifier at the first point is also fed into an amplitude detector. The output of this amplitude detector is then introduced to the second input of the phase comparator at whose other input is the output of the frequency discriminator previously mentioned. The phase angle between the two inputs to the phase comparator is an indication of the time it takes an electromagnetic wave to travel between the first and second points.

This system, while very uncomplicated, has several drawbacks which are found to be very disturbing in practice. For example, changes in atmospheric conditions can affect the traveling time of the magnetic waves. Since moreover, for longer distances, the value of traveling time depends on the difference between two measured values any changes in each individual measurement are reflected to a much higher degree in the final result. This effect becomes more pronounced for higher modulation frequencies.

A second difficulty arises because of the non-linear distortions arising from the frequency demodulation process. Since it is not possible to measure the phase of a distorted oscillation with the same exactness as that of an undistorted wave, the distortions must be removed by filters. However, filters introduce phase shift as a function of frequency. Thus even small changes in the intermediate frequency result in phase shifts which are not desirable.

Another drawback is the sensitivity of the system towards topographical reflections. This difficulty could be minimized by using higher carrier frequencies since shorter waves can be directionalized more easily and thus reflections can more readily be suppressed. However, there are limits to this approach, since the modulation frequencies which can be chosen in the conventional system do not much exceed 10 megacycles per second. This results in a band width for the intermediate frequency amplifier of several hundred kilocycles per second. Thus if a carrier frequency of $3 \times 10^{14}$ cycles per second were chosen, each carrier frequency would have to be exact to $10^{-9}$ or $10^{-10}$, which is not possible with the current state of the art.

Summary of the invention

The object of this invention is to eliminate the above-mentioned drawbacks without introducing new difficulties. It is realized that the main reason for poor functioning of the conventional system is to be found in the combination of frequency modulation and the narrow band intermediate frequency amplifier. According to this invention, it is essential that an intermediate frequency amplifier is used which has a sufficiently broad frequency band to permit at least the passage of the first order side bands of the modulation frequency. If the output of such an intermediate frequency amplified is amplitude limited, a wave results which is frequency modulated by the beat frequency of the two modulation frequencies. This wave is demodulated with the help of a frequency discriminator, resulting in a wave having the beat frequency of the two modulation frequencies. This may if necessary be amplified again, and is then fed into an amplitude demodulator. The output of this amplitude demodulator is applied as additional modulation to the carrier frequency generator at the second point. At the first point the output of the amplitude demodulator is fed into one input of a phase comparator, who other input is energized by the output of the frequency demodulator. The phase difference indicated by the phase comparator is again a measure of the trevelling time of the electromagnetic wave from the first point to the second point.

This method removes the difficulties of the previously described system. In a method or system according to this invention the modulation frequencies may be chosen as low as desired and so a unique phase indication may be obtained even for larger distances. This could not be accomplished in the previous systems, since otherwise the modulation sidebands would be within the band width of the intermediate frequency amplifier. Thus the output of the intermediate frequency amplifier would not contain the amplitude modulation which is essential for the functionnig of the known system. In this case the uniqueness of phase indication can only be obtained by measuring the difference of two measured values.

In the method of this invention the distortions which arise from the non-linearity of the demodulation characteristic may be obviated by use of a quadratic amplitude demodulator or may be reduced by using a different modulation index for each carrier frequency generator. Also, no rigid requirements must be set for the frequency stability of the carrier frequency generators since the band width of the intermediate frequency amplifier may be made sufficiently large.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Brief description of the drawing*

The figure is a block diagram of the system disclosed in this invention.

*Description of the preferred embodiment*

As shown in FIG. 1 there is a first point and a second point. There is a modulation frequency generator 12 and 12a and a carrier frequency generator 11 and 11a at each of said first and second points and a frequency modulated electromagnetic wave is generated at each of said points. Both the carrier frequency and the modulation frequency at the first point differs slightly from the corresponding values of carrier frequency and modulation frequency at the second point. The frequency modulated electromagnetic wave is transmitted by transmitter 13 and received at receiver 14a at the second point. It is then mixed in mixer 15a with the locally generated frequency modulated electromagnetic wave. Intermediate frequency amplifier 16a, then amplifies the resultant signal over a band width to include at least the first order side bands of the modulation frequency. The signal generated by intermediate frequency amplifier 16a is frequency modulated by the beat frequency of the two modulation frequencies. After amplitude limitation in stage 17a the signal is frequency demodulated, resulting in a wave whose frequency is the beat frequency of the two modulation frequencies. This signal is fed into the amplitude demodulator 19a, possibly coded in the coder and used as an additional modulator on the carrier frequency generator 11a. The resultant doubly modulation signal is then transmitted by the transmitter 13a and received at receiver 14. At the first point it is further mixed in mixer 15 with the locally generated frequency modulated electromagnetic wave, intermediate frequency amplified in stage 16 and amplitude limited in stage 17 as at the second point and then frequency demodulated by frequency demodulator 18. The output of frequency demodulator 18 contains both the amplitude modulated electromagnetic wave and the possible coded indication of the second carrier modulation of carrier 2. The output of frequency demodulator 18 is thus fed into an amplitude demodulator 19, whose output is in turn fed to one input of a phase comparator 20, whose other input is connected to a decoder 21 which in turn is energized by frequency demodulator 18. The indication on the phase comparator is a measure of the distance the electromagnetic wave traveled from the first point to the second point.

While the invention has been illustrated and described as embodied in a frequency modulation system, it is not intended to be limited to the details shown, since other modulation systems may be used without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a method for measuring the distance from a first point to a second point based on measuring the travelling time of electromagnetic waves, wherein a first frequency modulated electromagnetic wave is generated at said first point and a second frequency modulated electromagnetic wave having a carrier and modulation frequency slightly different from that of said first modulated electromagnetic wave is generated at said second point, said first modulated electromagnetic wave is then transmitted to said second point and received at said second point and wherein said first and second electromagnetic waves are heterodyned at said second point to yield a first modulated intermediate frequency wave, the steps, in combination, of amplifying said first modulated intermediate frequency wave over such a frequency range as to allow the passage of the first order side bands of said modulation frequency, to yield a first amplified modulated intermediate frequency wave; amplitude limiting said first amplified modulated intermediate frequency wave to yield a first amplitude limited intermediate frequency wave; frequency demodulating said first amplitude limited intermediate frequency wave to yield a first comparison wave; amplitude demodulating said first comparison wave to yield a second comparison wave; additionally modulating said second modulated electromagnetic wave with said second comparison wave to yield a doubly modulated wave; transmitting said doubly modulated wave from said second point to said first point and receiving said doubly modulated wave at said first point; heterodyning said doubly modulated wave with said first frequency modulated electromagnetic wave at said first point to yield a second modulated intermediate frequency wave; amplifying said second modulated intermediate frequency wave over a frequency range as to include the first order side bands of said modulation frequency, to yield a second amplified intermediate frequency wave; amplitude limiting said second amplified intermediate frequency wave to yield a second amplitude limited intermediate frequency wave; frequency demodulating said second amplitude limited intermediate frequency wave to yield a third comparison wave; amplitude demodulating said third comparison wave to yield a fourth comparison wave; and comparing the phase of said third comparison wave and said forth comparison wave to yield a measure of the distance between said first and second points.

2. A method as set forth in claim 1 also comprising the step of coding said first comparison wave and decoding said third comparison wave.

3. In a system for measuring the distance from a first point to a second point based on measuring the travelling time of electromagnetic waves, having means for generating a first frequency modulated electromagnetic wave at said first point, and means for generating a second frequency modulated electromagnetic wave at said second point, both the carrier frequency and the modulation frequency of said second frequency modulated electromagnetic wave differing slightly from the corresponding frequencies of said first frequency modulated electromagnetic wave, said system also having means for transmitting said first frequency modulated electromagnetic wave from said first point to said second point and means for receiving said first frequency modulated electromagnetic wave at said second point, and means for heterodyning said first and second frequency modulated electromagnetic waves at said second point to yield a first modulated intermediate frequency wave, in combination, means for amplifying said first modulated intermediate frequency wave over such a frequency range as to allow the passage of the first order side bands of said modulation frequency, to yield a first amplified modulated intermediate frequency wave; means for amplitude limiting said first amplified intermediate frequency wave to yield a first amplitude limited intermediate frequency wave; means for frequency demodulating said first amplitude limited intermediate frequency wave to yield a first comparison wave; means for amplitude demodulating said first comparison wave to yield a second comparison wave; means for additionally modulating said second modulated electromagnetic wave with said second comparison wave to yield a doubly modulated wave; means for transmitting said doubly modulated wave from said second point to said first point and means for receiving said doubly modulated wave at said first point; means for heterodyning said doubly modulated wave with said first frequency modulated electromagnetic wave at said first point to yield a second modulated intermediate frequency wave; means for amplifying said second modulated intermediate frequency wave over such a frequency range as to include the first order side bands of said modulation frequency to yield a second amplified intermediate frequency wave at said first point; means for amplitude limiting said second amplified intermediate frequency wave to yield a second amplitude limited intermediate frequency wave; means for frequency demodulating said second amplitude limited intermediate frequency wave to yield a third comparison wave; means for amplitude demodulating said third comparison wave to yield a fourth comparison wave; and means for comparing the phase of said third comparison wave and said fourth comparison wave to yield a measure of the distance between said first and second points.

4. A system as set forth in claim 3 also comprising means for coding said first comparison wave and means for decoding said third comparison wave.

References Cited
UNITED STATES PATENTS

| | | | |
|---|---|---|---|
| 2,907,999 | 10/1959 | Wadley | 343—12 |
| 3,144,645 | 8/1964 | McIver et al. | 343—6.5 X |
| 3,241,139 | 3/1966 | Wadley | 343—12 |

RODNEY D. BENNETT, *Primary Examiner.*

J. P. MORRIS, *Assistant Examiner.*